United States Patent [19]

Chuang

[11] Patent Number: 5,262,094
[45] Date of Patent: Nov. 16, 1993

[54] FRACTIONATION TRAY HAVING PACKING IMMEDIATELY BELOW TRAY DECK

[75] Inventors: Karl T. Chuang, Edmonton, Canada; Chong-Si Xu, Hangzhou, China; Guangxia Chen, Edmonton, Canada

[73] Assignee: UOP, Des Plaines, Ill.

[21] Appl. No.: 941,609

[22] Filed: Sep. 8, 1992

Related U.S. Application Data

[63] Continuation-in-part of Ser. No. 528,199, May 25, 1990, abandoned.

[51] Int. Cl.⁵ .............................................. B01F 3/04
[52] U.S. Cl. ...................................... 261/97; 261/98; 261/113; 261/114.1
[58] Field of Search ............... 261/113, 97, 98, 94, 261/114.1; 55/259

[56] References Cited

U.S. PATENT DOCUMENTS

| | | | |
|---|---|---|---|
| 2,676,670 | 4/1954 | Gagnaire | 261/113 |
| 2,691,423 | 10/1954 | McIlvaine | 261/94 |
| 2,877,099 | 3/1959 | Bowles | 261/114.1 |
| 3,410,540 | 11/1968 | Bruckert | 261/113 |
| 3,467,365 | 9/1969 | Webster | 261/114.3 |
| 3,856,487 | 12/1974 | Perez | 55/259 |
| 3,887,665 | 6/1975 | Mix et al. | 261/114.1 |
| 4,185,075 | 1/1980 | Ellis et al. | 261/113 |
| 4,582,569 | 4/1986 | Jenkins | 261/114.5 |
| 4,808,350 | 2/1989 | Robbins et al. | 261/96 |
| 4,842,778 | 6/1989 | Chen et al. | 261/97 |

FOREIGN PATENT DOCUMENTS

| | | |
|---|---|---|
| 233878 | 5/1925 | United Kingdom . |
| 1250703 | 10/1971 | United Kingdom ............ 261/114.3 |

Primary Examiner—Tim Miles
Attorney, Agent, or Firm—Thomas K. McBride; John F. Spears, Jr.

[57] ABSTRACT

The invention improves the performance of fractionation trays and comprises placing a bed-like layer of packing material closely adjacent the bottom surface of the tray. The packing is located in the so-called "disengagement" zone under the tray and does not extend down to the tray below. Means are provided to spread liquid from the tray above onto the packing material.

7 Claims, 2 Drawing Sheets

FRACTIONATION TRAY HAVING PACKING IMMEDIATELY BELOW TRAY DECK

CROSS REFERENCE TO RELATED APPLICATION

This application is a continuation-in-part of our prior application Ser. No. 07/528,199 filed May 25, 1990 and now abandoned. The entire teaching of my prior application is expressly incorporated herein.

FIELD OF THE INVENTION

This invention relates to gas-liquid contacting apparatus, such as fractionation trays, used for the separation of volatile materials in a fractional distillation column.

There are two basic types of gas-liquid contacting apparatus in use in distillation and adsorption. These are: (i) sieve or perforated trays which offer low efficiency and low cost, and (ii) random or ordered packed beds which are more efficient but which are also more expensive.

Sieve trays and packings are used extensively in gas-liquid contact applications such as distillation. In general, sieve trays are considered less efficient than the use of packings. This is in part due to the fact that there is a large space above the froth on the sieve tray that is not active for mass transfer. If we consider a typical froth height of 150 mm and a tray efficiency of 60%, then the height equivalent to a theoretical plate (HETP) would be 250 mm, a value close to that for the high performance structured packing. However, the vapor-liquid disengagement space above the froth is necessary for maintaining hydraulic stability of the tower. This space is about 2-3 times the froth height and as a result the HETP for a sieve tray is about 700 mm. This HETP is similar to that for a low efficiency random packing but considerably higher than that for a structured or ordered packing.

PRIOR ART

U.S. Pat. No. 2,676,670 issued to L. Gagnaire illustrates an apparatus for purifying gases by removing condensate and solid particles. The apparatus includes a bubble plate 10 and a packed bed 12 above the tray. The packed bed is employed to help remove particles from the gas of the feed stream. At each tray level cleaning liquid is withdrawn via line 16 and returned to the top of the column via lines 19 and 20.

U.S. Pat. No. 3,887,665 issued to T. W. Mix et al. illustrates the use of vapor-liquid disengagement and separation means 30 (col. 2, lines 30-42, col. 3, lines 44-50). These are deentrainment devices not intended as packing used for vapor liquid contacting. The deentrainment devices are not shown as being located directly under the trays.

U.S. Pat. No. 4,842,778 issued to G. Chen et al. illustrates a number of structural variations in packed vapor-liquid separation columns and teaches the importance of initial vapor and liquid distribution and maintenance of this distribution throughout the bed in order to maximize efficiency. This reference illustrates the use of both random and structured packing 14 having multilayer flow distribution sections for distributing liquid across the packing.

U.S. Pat. No. 4,808,350 issued to L. A. Robbins et al. is representative of the multitude of devices which have been developed to provide uniform distribution of liquid across packed contacting columns. It is a characteristic of these devices that they collect the liquid and then redistribute it without providing vapor-liquid contacting as is performed on a fractionation tray.

U.S. Pat. No. 3,410,540 issued to W. Bruckert is believed pertinent for its showing of the structure of a prior art multiple downcomer type tray employing a highly distinctive downcomer design similar to that which may be employed in the subject invention.

BRIEF SUMMARY OF THE INVENTION

There is a need for a gas-liquid contacting apparatus which makes use of sieve or frothing trays and yet has high mass transfer rates and high gas-liquid throughput.

According to the present invention there is provided a gas-liquid contacting apparatus, comprising: (a) an upwardly extending casing forming a flow path for the flow of liquid downwardly therethrough and flow of gas upwardly therethrough; (b) a series of frothing trays extending across and partitioning the flow path in the casing at different levels, each tray being perforated for distributing liquid thereacross which has been frothed by upwardly flowing gas therethrough; (c) for each pair of frothing trays, a perforated packing tray partitioning the portion of the flow path of the casing therebetween to provide a flow path packing section immediately beneath one of the frothing trays, and a flow path frothing section immediately above the lower one of those frothing trays; and (d) gas-liquid distributing packings in the packing section.

Another embodiment may be characterized as a gas-liquid contacting apparatus comprising: (a) a cylindrical outer vessel; (b) a plurality of vertically spaced apart fractionation trays located within said outer vessel; (c) a plurality of beds of packing material with each bed of said plurality being (i) placed between a pair of two of said vertically spaced trays (ii) located closer to an upper tray than to a lower of said pair of trays; and, (iii) being equal in volume to less than one-half of the available volume in the outer vessel between said pair of trays; and, (d) means to distribute liquid collected on said upper tray on said bed of packing material.

In some embodiments of the present invention an uppermost packing section is provided in the casing above the level of the uppermost frothing section, and gas-liquid distributing packings are provided in the uppermost packing section.

In some embodiments of the present invention, fluid permeable, gas distributing means are provided for each frothing tray, each fluid permeable, gas distributing means being adjacent the top side of the tray associated therewith for, in operation, breaking up any bubbles forming on the pores of that frothing tray.

DETAILED DESCRIPTION AND PREFERRED EMBODIMENTS

The accompanying drawings illustrate by way of example, some embodiments of the present invention.

Figure 1:
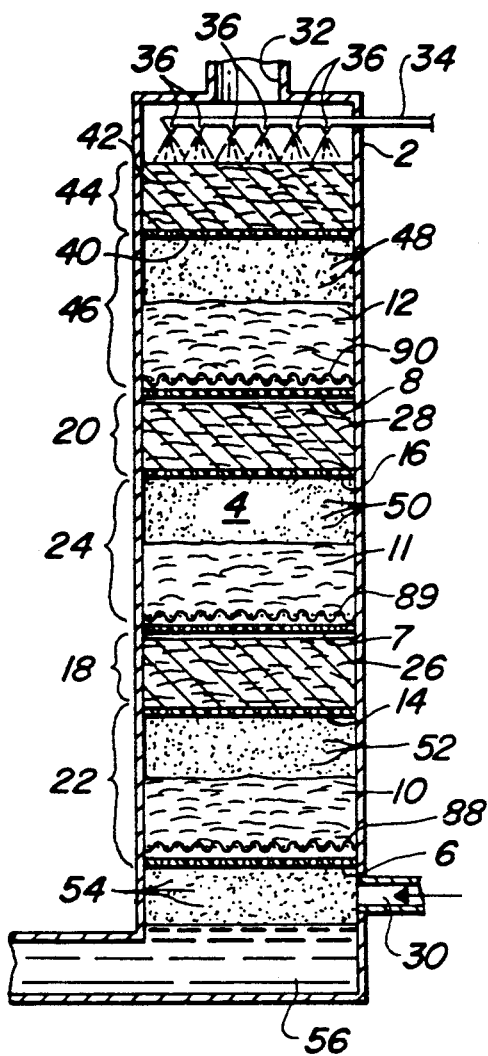
FIG. 1 is a diagrammatic, sectional side view of a gas-liquid contacting apparatus.

Referring now to FIG. 1 there is shown a gas-liquid contacting apparatus, generally designated 1, comprising: (a) an upwardly extending cylindrical casing forming a flow path 4 for the flow of liquid downwardly therethrough and flow of gas upwardly therethrough; (b) a series of frothing trays 6 to 8 extending across and partitioning the flow path 4 in the casing 2 at different levels, each tray 6 to 8 being perforated sufficiently to allow the downward flow of liquid through the deck portion thereof and for distributing liquid thereacross which has been frothed, to form froths 10 to 12 respectively, by gas simultaneously flowing upwardly therethrough; (c) for each pair of frothing trays 6, 7 or 7, 8, a perforated packing tray, 14 and 16 respectively, partitioning the portion of the flow path of the casing 2 therebetween to provide a flow path packing section, 18 and 20 respectively, immediately beneath the upper one, 7 and 8 respectively, of the frothing trays, and a flow path frothing section, 22 and 24 respectively, immediately above the lower one, 6 and 7 respectively, of those frothing trays; and, (d) gas-liquid distributing packings 26 and 28 in the packing sections 18 and 20 respectively.

The frothing trays are fractionation trays as compared to liquid distributors found in packed trays. Some characteristics of fractionation trays include: a closer vertical spacing for fractionation trays; a design which causes intimate, vigorous contact of liquid retained on the tray with gas passing upward through the tray; an abundance of closely spaced perforations across a high percentage of the decking area of the fractionation trays; and a design which leads to the formation of froth on the surface of fractionation trays. Fractionation trays make no attempt to collect and segregate vapor and/or liquid flow before redistributing these phases. By its very nature a liquid distributor would have no use for downcomers which transfer liquid downward any appreciable distance.

The upwardly extending casing 2 has a gas inlet 30, a gas outlet 32, a liquid inlet pipe 34 feeding liquid spray nozzles 36 and liquid outlet 38.

The packings 26 and 28 may be random packings or may be structured to form an ordered bed.

In this embodiment, a further, perforated, packing tray 40 is provided supporting a packed bed 42 in a packing section 44 beneath the liquid spray nozzles 36, and above a frothing section 46 above the frothing tray 8.

In operation, gas is fed into the casing 2 through the inlet 30 while liquid is fed along the pipe 34 to the nozzles 36. The liquid is sprayed onto the packings 42 to trickle downwardly therethrough in a well distributed manner and emerge therefrom as droplets 48 which fall onto the frothing tray 8. The droplets 48 falling onto the frothing tray 8 form a liquid level thereon some of which is frothed, to form froth 12, by the gas passing upwardly through the casing 2 from the inlet 30. Some of the liquid on the frothing tray 8 escapes through the perforations to form droplets well distributed over the packings 28.

The droplets trickle downwardly through the packings 28 and emerge as droplets 50 which fall onto the frothing tray 7 to form a liquid level thereon some of which is frothed, to form froth 11, by the gas passing upwardly through the casing 2. Some of the liquid on the frothing tray 7 escapes through the perforations to form droplets 52 which trickle downwardly through the packings 26 to fall as droplets on the frothing tray 6 where a liquid level is formed and froth 10 is made by upwardly flowing gas. Liquid escaping through the perforations in the frothing tray 6 forms droplets 54 which collect as liquid 56 which forms a liquid, draining seal.

It will be seen that gas passing upwardly through the casing 2 is brought into intimate contact with liquid passing downwardly therethrough because: (i) the usually inactive space above a frothing tray is used as a gas-liquid contacting section by partitioning the casing 2 above each tray to form an upper, packing containing section and a lower frothing section; (ii) the packings provide good distribution of the droplets falling gently through the frothing sections onto the frothing trays; and (iii) the frothing trays provide good distribution of the droplets falling through their perforations onto the packings.

The result is that in a gas-liquid transfer operation such as methanol-water distillation, the apparatus according to the present invention can achieve a combined efficiency for the frothing trays and packings of, say, 135% compared with an efficiency of, say, 65% for a low cost, conventional apparatus containing only frothing trays where only a low throughput is possible.

Furthermore, the efficiency and/or throughput of an apparatus according to the present invention has been found to compare favorably with the more expensive apparatus containing only packed beds.

Also, when the gas flow is high, the packings have been found to serve as de-entrainment sections thus further improving the gas-liquid contact.

The provision of the extra packings 42 enhance the distribution of the sprayed liquid from the nozzle in addition to providing additional gas-liquid contact. This is an optional item which may be deleted.

Tests to verify the present invention were carried out in a 6 inch diameter column for the distillation of methanol-water mixtures. A dual-flow tray was used with 318 mm tray packing, 7 mm hole diameter and 20% hole area combined with a 100 mm high structured packing supplied by Glitsch, Inc. of Dallas, Tex. under the trademark Gempack-350. The results indicated (1) a tray efficiency of ~120–140% for an F-factor of 0.8–1.6 $kg^{\frac{1}{2}}s^{-1}m^{-\frac{1}{2}}$ and (2) a maximum operable F-factor = 1.8. This compares with an efficiency of 60% and maximum F-factor 1.4 for a sieve or frothing tray with similar tray spacing.

Tests have shown that the packing sections need only be short, say 200 mm, and so wall effects are insignificant.

The gas may be in the form of a vapor.

The frothing trays 6 to 8 may be provided with more perforations per unit area adjacent the casing 2 than at the center area of the trays 6 to 8 to provide better distribution of liquid over the packings 26 and 28. It may be noted there is no packing material on the surface of the frothing trays or in the volume immediately above the trays. This allows conventional frothing and liquid flow to occur.

The apparatus according to the present invention can be used in any distillation or absorption process. The packings may be random packings, e.g., rings, spheres or saddles or structured or ordered bed packings, e.g., corrugated, rolled, screens or plates.

The apparatus according to the present invention can be in the form of a new apparatus or a modified existing apparatus. That is an existing trayed column may be modified to employ the subject invention.

The combination of low cost and high efficiency of an apparatus according to the present invention can result in substantial savings in, for example, the chemical, petroleum and paper industries.

Any known countercurrent tray arrangement, such as, for example, dual-flow trays, and multiple downcomer trays may be used.

Figure 2:
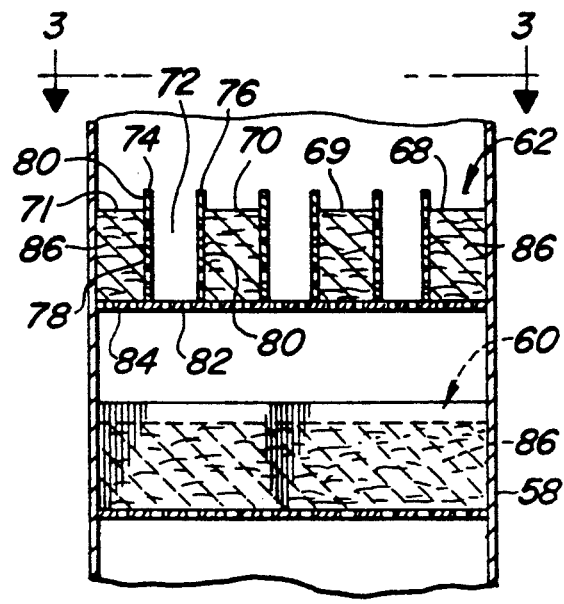
FIG. 2 is a diagrammatic, sectional side view along II—II, FIG. 3 of a portion of a different gas-liquid contacting apparatus to that shown in FIG. 1.
Figure 3:
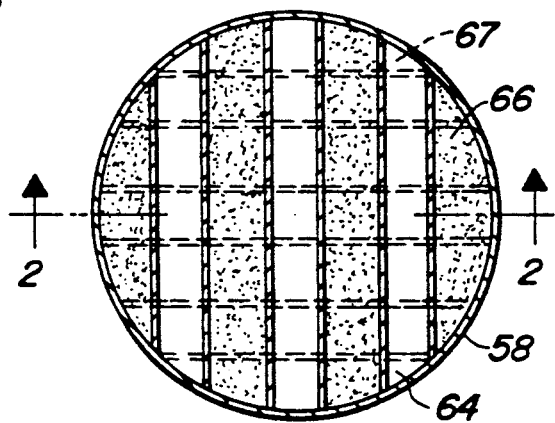
FIG. 3 is a diagrammatic, sectional plan view along III—III, FIG. 2.

Referring now to FIGS. 2 and 3, there is shown two Multiple Downcomer trays modified for use of the subject invention.

Each frothing tray may be in the form of a Multiple Downcomer as sold by UOP of Des Plaines, Ill. and comprise a plurality of spaced deck portions spanning the width of the interior of the casing, with the portions of one frothing tray traversing the deck portions of vertically adjacent trays, with each space between two deck portions of a frothing tray having a downcomer provided and leading therefrom, each downcomer having perforated side walls and an impermeable lower wall, with each packing tray further comprising a plurality of perforated packing tray portions each closing a packing section beneath a frothing tray deck portion which is bounded by at least one downcomer perforated side wall such that the gas-liquid distributing packings are in each packing section beneath each frothing tray portion. That is, the frothing tray may be a conventional Multiple Downcomer tray modified by the provision of perforations in the downcomer sidewalls and the addition of packing between the downcomers. The perforations are means to spread liquid on the narrow packing beds.

Before proceeding further with a description of the embodiment shown in FIG. 3, it is useful to define and characterize the type of tray referred to herein as a "Multiple Downcomer" tray. This term is used herein to distinguish the subject invention from other types of fractionation trays.

A Multiple Downcomer tray is distinguished from the conventional crossflow tray by several structural characteristics. First, a multiple downcomer tray does not have a "receiving pan". This is the normally imperforated section located below an inlet downcomer opening. Reference is made to U.S. Pat. No. 4,582,569 to A. E. O. Jenkins which illustrates a receiving pan 8 in FIG. 1. A receiving pan is the imperforate area upon which the liquid descending through the downcomer impacts before passing onto the decking of the tray. Often the receiving pan is separated from the decking or "active" area of the tray by an inlet weir. Receiving pans are therefore normally located directly below the downcomer leading from the next above conventional fractionation tray.

The horizontal surface area of a Multiple Downcomer fractionation tray is basically divided into downcomer means and vapor-liquid contacting area normally referred to as decking. There are no imperforate areas allocated to receiving descending liquid from the tray located immediately above.

Another distinguishing feature of Multiple Downcomer fractionation trays is the provision of a relatively large number of trough-like downcomer means across the tray. The subject trays can employ from one to seven or more downcomers. These downcomer means are spaced relatively close together compared to the customary crossflow fractionation trays as they are spread across the surface of the tray rather than being at the periphery of the tray. The distance between adjacent downcomers (measured between their sidewalls or weirs) of the same tray is normally between 0.3 and 1.0 meters and will often be less than 0.5 meter. This results in a multiple downcomer type tray having a unique design when viewed from above consisting of the alternating decking areas and downcomer means evenly spaced across the upper surface of the fractionation tray, as for instance shown in FIG. 1.

The actual downcomer means of a Multiple Downcomer tray are also unique compared to the downcomers employed upon normal cross-flow fractionation trays. The downcomer means do not extend downward to the next fractionation tray. Rather they stop at an intermediate distance located between the two trays. The downcomer descending from the tray above therefore stops well above the deck surface and the inlet to the downcomers of the tray below. The top or inlet to the downcomer of a multiple downcomer tray functions as the outlet weir of the tray, and the bottom of the downcomer of a multiple downcomer tray above is therefore well above the outlet weir of the tray located below.

Yet another distinguishing feature of Multiple Downcomer type fractionation trays is the provision of a liquid sealable means in the bottom or outlet of the downcomer means. The bottom of the downcomer means is therefore partially closed off by a plate having various perforations or by some other means intended to retard the direct downward flow of liquid out of the downcomer means. This liquid sealable outlet is located well above the deck of the tray located immediately below and is at a level above the inlet of the downcomers associated with this next lower tray. The descending liquid is collected in the lower portion of the downcomer means and spills forth upon the next lower tray through these openings.

There is no inlet weir at the bottom of the downcomer of Multiple Downcomer type trays as in a crossflow tray. The liquid sealable outlet performs this function and, again, the bottom of the downcomer is well above the next tray.

Multiple Downcomer trays are also characterized by a very short liquid flow path between the point at which the liquid first falls on the tray and the point at which the liquid exits the tray via the downcomer means. This is due primarily to the close spacing of the downcomers as described above.

In FIGS. 2 and 3 there is shown a portion of a casing (outer vessel wall) 58 containing two frothing trays generally designated 60 and 62. Each tray is divided into four spaced portions spanning the width of the interior of the casing, that is portions 64 to 67 of tray 60, and portions 68 to 71 of tray 62. The portions 64 to 67 traverse the portions 68 to 71 and any portions of any further trays that are provided will primarily traverse the portions of any adjacent trays.

The spaces between the tray portions, such as space 72 between tray portions 70 and 71, form drainage openings bounded by upstanding weirs 74 and 76 on the tray portions 70 and 71. The drainage openings, such as that formed by space 72 lead to spaced, parallel downcomers each having perforated side walls such as side walls 78 and 80, and an impermeable lower end wall, such as end wall 82.

The spacings beneath the frothing tray portions such as tray portion 71, and bounded by the perforated side walls, such as side wall 78, are packing sections and are each closed at the lower end by a perforated packing tray portion, such as packing tray portion 84, and are filled with packings, such as packings 86.

In operation, gas is passed upwardly through the casing 58 while liquid is sprayed into the upper end (not shown) of the casing 58 and gravitates downwardly therethrough.

Some of the liquid descending onto, say, the tray portions 68 to 71 is foamed by gas passing upwardly through, say, the packings 86, so that foam will overflow the weirs, such as weirs 74 and 76 and flow down the downcomers and through the perforated side walls, such as those designated 78 and 80. The remainder of the liquid descending onto, say, the tray portions 68 to 71 is distributed downwardly over, say the packings 86.

Liquid entering, say, the packings 86, trickles downwardly to exit through the perforated plate 84 and fall onto the tray portions 64 to 67 where the same sequence of operations is repeated.

This Multiple Downcomer tray embodiment may be thought of as the addition of beds of packing material to the normally open spaces located between adjacent downcomers. These beds may be retained by a single support screen at the level of the bottom of the downcomers or by individual screens extending horizontally between the downcomers. As a further alternative the packing support screen may be located some distance below the bottom of the downcomers and the packing between the downcomers is part of a larger overall packing bed. In this embodiment the means to supply liquid to the packing bed comprises perforations in the sidewalls. Openings in the decking material may alternatively or in addition be used for this purpose.

Figure 4:
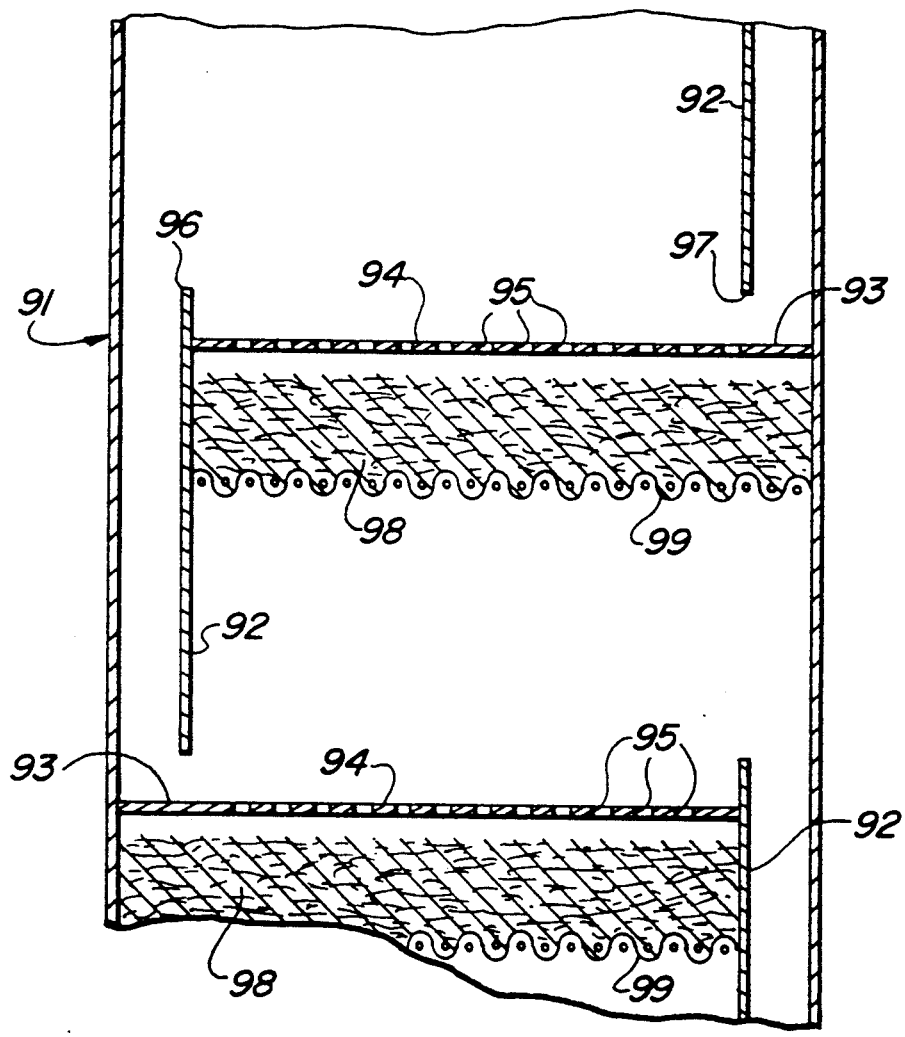
FIG. 4 is a diagrammatic, sectional side view of a different embodiment of a column employing the subject invention.

Those skilled in the art will recognize there are a number of ways to distribute liquid from the tray to the packing. It is preferred to avoid the use of any mechanically complex system involving conduits, pipes and valves, inclined troughs, etc. Liquid spread across the packing may be derived from a downcomer, a separate liquid collection area or from the tray deck itself. For most purposes it is preferred to utilize some form of "dual flow" tray decking. This type of decking allows liquid to flow downward through the tray decking while vapor simultaneously passes upward, normally by the provision of rather large perforations in the deck material. That is, the tray intentionally allows liquid to "weep" downward. In a conventional dual flow tray, the entire downward liquid flow in the column passes through the tray deck in this manner. This degree of liquid flow through the decking may not be optimum in all situations in which the subject tray is applied and it is therefore contemplated that a combination of a limited dual flow decking will be used in conjunction with conventional downcomers as shown in FIG. 4. Valving means known to the art may also be placed on the tray to regulate liquid and vapor flow.

In different embodiments of the present invention, fluid permeable, gas distributing means 88 to 90, FIG. 1, are provided for each frothing tray 6 to 8 respectively. Each fluid permeable, gas distributing means 88 to 90 being adjacent the top side of the tray, 6 to 8 respectively, associated therewith, for, in operation, breaking up any bubbles (not shown) forming on the pores (not shown) of that frothing tray 6 to 8.

The fluid permeable, gas distributing means 88 to 90 also assure a more uniform static head of liquid on the frothing trays 6 to 8 and a more uniform distribution of liquid across them. This gives a more uniform distribution of liquid gravitating downwardly through the trays 6 to 8.

The fluid permeable, gas distributing means may be fibrous or filamentary material in open mat, felt or woven form.

The fluid permeable, gas distributing means may be an open mesh.

The fluid permeable, gas distributing means 88 to 90 achieve a more uniform froth formation on the trays 6 to 8.

FIG. 4 illustrates a sideview of relatively conventional fractionation column in which the subject invention has been installed. The portion of the column shown in the drawing comprises a cylindrical outer vessel 91 and a pair of vertically spaced fractionation trays. The upper tray comprises a substantially flat perforated decking section 94 having numerous evenly spaced openings 95 to allow upward vapor flow. A first portion of the liquid flows downward through the column in the volume located between the sidewall 91 and the imperforate, planar downcomer wall 92. The liquid impacts the receiving pan area 93 under the downcomer outlet and largely flows across the upper surface of the tray to the inlet of the next downcomer. While traversing an operating tray, the liquid is frothed by vapor rising through the decking. Liquid and/or froth overflows the upper edge 96 of the downcomer wall, which serves as an outlet weir. Coalesced liquid flows through the second downcomer to the lower tray. In the subject invention a bed 98 of packing material is placed under each of the trays. In the embodiment shown in the Figure, the bed is suspended by a porous wire screen 99. The screen 99 may be itself held in place in a number of ways. The screen may rest on a grid or a plurality of support bars not shown which crisscross the internal volume of the column in a plane parallel to the tray. The screen 99 or the individual packing elements may alternatively be suspended (hung) from the tray above. These mechanical details will be varied to suit individual situations and are not deemed a limitation on the inventive concept. Some portion, e.g., 25-70 vol. % of the liquid flowing across the tray deck 94 flows downward through openings 95 to allow liquid to flow onto the packing 98.

The upper surface of the packing bed 98 is shown in the Figure as being located a short distance below the bottom surface of the tray deck 94. The top of the packing may be from 1 to 8 centimeters below the tray, with a gap of 2-3 centimeters being preferred. Alternatively the top of the packing bed may be in contact with the lower surface of the tray. With a dumped packing the upper surface of the bed will be somewhat irregular. The packing material bed may be in the form of preassembled units which are installed under preexisting trays, fabricated in situ under trays or made as an integral part of the overall tray structure. Structured packing may be added to the tray as bundles or subassemblies which together form the packing bed. A dumped packing may be added to the bed through openings in the wall of the outer vessel or through openings in the tray deck above. This unstructured packing may also be preloaded in porous retaining baskets which are then installed under the tray.

The amount of packing used with any one tray is preferably equal in volume to less than 50 percent of the open volume of the column between the upper and lower trays of the pertinent tray pair. The packing bed of the subject invention preferably extends downward to within 8 centimeters of the intended upper surface of the froth on the next lower tray. A minimum bed thickness of 10 cm is desired, with beds up to 30 cm thick being contemplated. The subject packing bed therefore will not touch the next lower tray or interfere with fluid flow across the tray.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s) and figures. The invention extends to any novel one, or any novel combination, of the features disclosed in this specification (including any accompanying claims, abstract and drawings), or to any novel one, or any novel combination, of the steps of any method or process so disclosed.

What is claimed is:

1. A gas-liquid contacting apparatus comprising:
   (a) a fractionation tray comprising a perforated tray deck having upper and lower surfaces and at least one downcomer, with the tray having means for the passage of vapor through the tray deck;
   (b) a bed of packing material adjacent the lower surface of said tray deck; and,
   (c) means to distribute liquid descending through the tray over the bed of packing material.

2. The apparatus of claim 1 wherein said means to distribute liquid over the bed of packing material comprises perforations in the tray deck.

3. A gas-liquid contacting apparatus comprising a plurality of the apparatus of claim 1 spaced vertically apart at uniform distances within a cylindrical outer vessel.

4. A gas-liquid contacting apparatus comprising:
   (a) a cylindrical outer vessel;
   (b) a plurality of vertically spaced apart fractionation trays located within said outer vessel and adapted to retain a frothed layer of liquid on an upper planar surface of the trays;
   (c) a plurality of beds of packing material with each bed of said plurality being
   (i) placed between a pair of said vertically spaced fractionation trays;
   (ii) located adjacent a lower planar surface of an upper tray of said pair of trays; and,
   (iii) being equal in volume to less than one-half of the available volume in the outer vessel between the pair of trays; and,
   (d) means to distribute liquid collected on said upper tray onto said bed of packing material.

5. The apparatus of claim 4 wherein said means to distribute liquid over the bed of packing material comprises perforations in the tray deck.

6. A gas-liquid contacting apparatus comprising:
   (a) an upwardly extending casing having an upper end and a lower end and forming an enclosed flow path for the flow of liquid downwardly therethrough and a flow of gas upwardly therethrough;
   (b) a series of frothing trays extending across and partitioning the flow path in the casing at different levels, each tray being perforated sufficiently to allow the downward flow of liquid through the deck portion thereof and for distributing descending liquid which has been frothed by gas flowing upwardly therethrough;
   (c) for each pair of frothing trays, a perforated, packing tray partitioning the portion of the flow path of the casing therebetween to provide a flow path packing section immediately beneath one of the frothing trays, and a flow path frothing section immediately above the lower one of those frothing trays; and
   (d) gas-liquid contacting and distributing packing in the packing section.

7. An apparatus according to claim 6, wherein an uppermost packing section is provided in the casing above the level of the uppermost frothing section, and gas-liquid distributing packings are provided in the uppermost packing section.

* * * * *